A. R. CUSHMAN.
HUB-CAP AND AXLE-NUT.

No. 189,433. Patented April 10, 1877.

Attest:
Edward S. Cushman
Joseph A. Cushman

Inventor:
Andrew R. Cushman

UNITED STATES PATENT OFFICE.

ANDREW R. CUSHMAN, OF MEMPHIS, MISSOURI.

IMPROVEMENT IN HUB-CAP AND AXLE-NUT.

Specification forming part of Letters Patent No. 189,433, dated April 10, 1877; application filed April 24, 1876.

*To all whom it may concern:*

Be it known that I, ANDREW R. CUSHMAN, of Memphis, in the county of Scotland and State of Missouri, have invented a new and useful Improvement in a Cap for the End of a Wagon or Buggy Hub, which improvement is fully set forth in the following specification, reference being had to the accompanying drawing.

Figure 1:
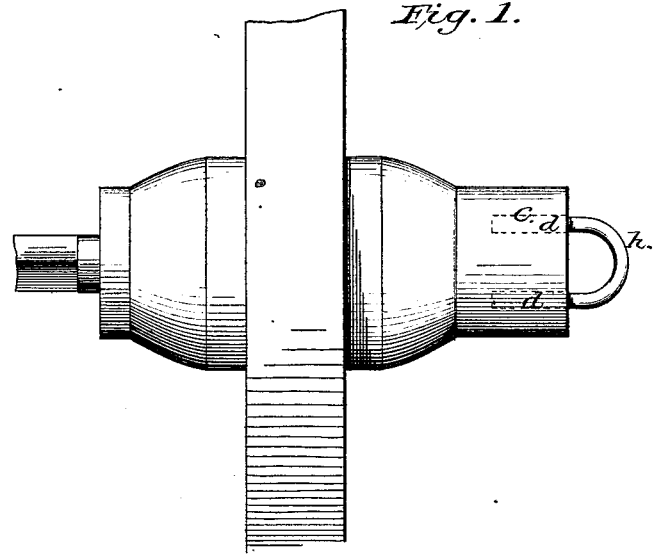
Figure 2:
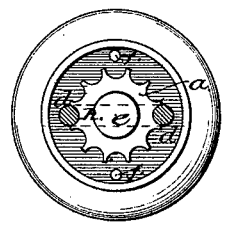
Figure 3:
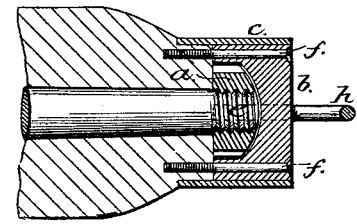

Figure 1 is a view of the hub with the cap on and the key inserted to take the wheel off. Fig. 2 is a view of the side of the cap as it fits against the hub. Fig. 3 is a view of the side of the cap that fits against the end of the hub.

The object of my invention is to take the wheel off of a buggy without using a wrench.

The nut $a$ is held in the cap $b$ by inserting the key marked $h$ into the holes $d\ d$ in the cap. The key clamps the nut, and holds it so that it turns with the wheel. By this means the wheel is taken off or put on without getting the hands greased. When the key is withdrawn, the wheel turns without moving the nut. The nut cannot get loose, and the dirt cannot get in to wear the nut. The cap is held to the hub by the screws $f\,f$, and can be fitted to any hub. It makes a neat finish, and is very clean, as no grease can run out.

I claim—

The solid hub-cap $b$, provided with holes $d\ d$, and secured to the hub by screws $f\,f$, in combination with grooved axle-nut $a$ and key $h$, substantially as described.

ANDREW R. CUSHMAN.

Witnesses:
J. A. CUSHMAN,
EDWARD S. CUSHMAN.